US012715700B2

(12) United States Patent
Kamei et al.

(10) Patent No.: US 12,715,700 B2
(45) Date of Patent: Aug. 25, 2026

(54) CONVEYOR BELT AND BELT CONVEYING APPARATUS

(71) Applicant: TSUBAKI YAMAKYU CHAIN CO., Tokyo (JP)

(72) Inventors: Katsuhisa Kamei, Tokyo (JP); Ryosuke Tanuma, Tokyo (JP); Tetsu Shimizu, Tokyo (JP)

(73) Assignee: TSUBAKI YAMAKYU CHAIN CO., Saitama (JP)

( * ) Notice: Subject to any disclaimer, the term of this patent is extended or adjusted under 35 U.S.C. 154(b) by 67 days.

(21) Appl. No.: 18/908,898

(22) Filed: Oct. 8, 2024

(65) Prior Publication Data

US 2025/0122019 A1 Apr. 17, 2025

(30) Foreign Application Priority Data

Oct. 12, 2023 (JP) ................................ 2023-176680

(51) Int. Cl.
*B65G 17/08* (2006.01)
*B65G 17/40* (2006.01)

(52) U.S. Cl.
CPC ............. *B65G 17/08* (2013.01); *B65G 17/40* (2013.01); *B65G 2207/12* (2013.01)

(58) Field of Classification Search
CPC ...... B65G 17/08; B65G 17/083; B65G 17/40; B65G 2207/12
USPC .......................................................... 198/853
See application file for complete search history.

(56) References Cited

U.S. PATENT DOCUMENTS 4,709,807 A * 12/1987 Poerink .................. B65G 17/08 411/509
4,826,705 A * 5/1989 Drain .................... C23C 14/042 427/520
4,858,753 A * 8/1989 Hodlewsky ............ B65G 17/08 198/853
5,253,749 A * 10/1993 Ensch .................... B65G 17/08 198/853
5,573,106 A * 11/1996 Stebnicki ............... B65G 17/08 198/853

(Continued)

FOREIGN PATENT DOCUMENTS

JP H02-75407 U 6/1990
JP 3331464 B2 10/2002

(Continued)

*Primary Examiner* — Mark A Deuble
(74) *Attorney, Agent, or Firm* — WHDA, LLP

(57) ABSTRACT

A conveyor belt includes belt components adjacent to each other in a first direction and a coupling shaft extending in a second direction. Each of the belt components includes coupling pieces. The coupling pieces each including a coupling hole. The belt components adjacent to each other in the first direction are coupled by inserting the coupling shaft through the coupling holes that are overlapped. The coupling shaft includes elastic pieces. At least one of the elastic pieces includes an engagement protrusion on an outer surface of the elastic piece. The coupling piece located at an end of the coupling pieces in the second direction is an end coupling piece. The end coupling piece includes an engagement groove on an inner circumferential surface of the coupling hole. The engagement groove extends continuously in a circumferential direction of the coupling hole.

19 Claims, 7 Drawing Sheets

(56) References Cited

U.S. PATENT DOCUMENTS

| | | | | |
|---|---|---|---|---|
| 5,662,211 | A * | 9/1997 | Quentin | F16G 13/08 198/853 |
| 6,036,002 | A * | 3/2000 | Kobayashi | B65G 17/063 198/853 |
| 6,213,292 | B1 * | 4/2001 | Takahashi | B65G 17/08 198/853 |
| 6,308,825 | B1 | 10/2001 | Nakamura | |
| 7,331,447 | B2 * | 2/2008 | Krisl | B65G 17/40 198/852 |
| 8,978,881 | B2 * | 3/2015 | Prakasam | B65G 17/08 198/853 |
| 2010/0083466 | A1 * | 4/2010 | Andersen | B65G 17/08 16/266 |

FOREIGN PATENT DOCUMENTS

| | | | |
|---|---|---|---|
| JP | 2003-312824 | A | 11/2003 |
| JP | 3586769 | B2 | 11/2004 |
| JP | 2019-182652 | A | 10/2019 |

* cited by examiner

CONVEYOR BELT AND BELT CONVEYING APPARATUS

CROSS-REFERENCE TO RELATED APPLICATIONS

This application is based upon and claims the benefit of priority from prior Japanese Patent Application No. 2023-176680, filed on Oct. 12, 2023, the entire contents of which are incorporated herein by reference.

BACKGROUND

1. Field

The present disclosure relates to a conveyor belt including belt components coupled to each other by a coupling shaft in a pivotable state, and to a belt conveying apparatus that uses this conveyor belt.

2. Description of Related Art

Among belt conveying apparatuses that convey workpieces such as articles, some use conveyor belts including belt components coupled to each other by a coupling shaft. This type of conveyor belt is constructed by pivotably coupling belt components adjacent to each other in the advancing direction of the conveyor belt by the coupling shaft. In conveyor belts, a plug is attached to the end of a belt component located at the end of the conveyor belt in the width direction, which is orthogonal to the advancing direction, to prevent the pivot shaft from falling off. The plug is used to close the shaft hole into which the coupling shaft is inserted. Refer to, for example, Japanese Patent No. 3586769 and Japanese Patent No. 3331464.

The plug for preventing the pivot shaft from falling off is separate from the belt component. Thus, there is a risk that the plug could detach due to factors such as vibrations repeatedly applied while the conveyor belt is running. The plug detached from the belt component may inadvertently mix with the workpieces being conveyed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A conveyor belt according to an aspect of the present disclosure includes belt components adjacent to each other in a first direction. The first direction is an advancing direction in which a workpiece is conveyed. The conveyor belt also includes a coupling shaft extending in a second direction. The coupling shaft pivotably couples the belt components adjacent to each other in the first direction. The second direction intersects the first direction and corresponds to a width direction of the conveyor belt. Each of the belt components includes coupling pieces that are arranged parallel to each other in the second direction. The coupling pieces each include a coupling hole through which the coupling shaft is inserted. The belt components adjacent to each other in the first direction are coupled by inserting, into a space between the coupling pieces of one of the belt components, the coupling piece of the other one of the belt components so that the coupling shaft is inserted through the coupling holes that are overlapped. The coupling shaft includes elastic pieces that move in a radial direction of the coupling hole. The elastic pieces are located at a basal end opposite to an insertion end from which the coupling shaft is inserted into the coupling hole. At least one of the elastic pieces including an engagement protrusion on an outer surface of the elastic piece. The coupling piece located at an end of the coupling pieces in the second direction is an end coupling piece. The end coupling piece includes an engagement groove on an inner circumferential surface of the coupling hole. The engagement groove extends continuously in a circumferential direction of the coupling hole. The engagement protrusion is configured to engage with the engagement groove.

A belt conveying apparatus according to an aspect of the present disclosure includes a conveyor belt. The belt conveying apparatus is configured to convey a workpiece by running the conveyor belt. The conveyor belt is the above-described conveyor belt.

A conveyor belt according to another aspect of the present disclosure includes belt components adjacent to each other in a first direction. The first direction is an advancing direction in which a workpiece is conveyed. The conveyor belt also includes a coupling shaft extending in a second direction. The coupling shaft pivotably couples the belt components adjacent to each other in the first direction. The second direction intersects the first direction and corresponds to a width direction of the conveyor belt. Each of the belt components includes coupling pieces that are arranged parallel to each other in the second direction. The coupling pieces each include a coupling hole through which the coupling shaft is inserted. The belt components adjacent to each other in the first direction are coupled by inserting, into a space between the coupling pieces of one of the belt components, the coupling piece of the other one of the belt components so that the coupling shaft is inserted through the coupling holes that are overlapped. The coupling piece located at an end of the coupling pieces in the second direction is an end coupling piece. A detachment prevention member that prevents the coupling shaft from being removed is arranged in the coupling hole of the end coupling piece. The detachment prevention member includes elastic pieces that move in a radial direction of the coupling hole. At least one of the elastic pieces includes an engagement protrusion on an outer surface of the elastic piece. The end coupling piece includes an engagement groove on an inner circumferential surface of the coupling hole. The engagement groove extends continuously in a circumferential direction of the coupling hole. The engagement protrusion is configured to engage with the engagement groove.

A belt conveying apparatus according to another aspect of the present disclosure includes a conveyor belt. The belt conveying apparatus is configured to convey a workpiece by running the conveyor belt. The conveyor belt is the above-described conveyor belt.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A belt conveying apparatus according to the present disclosure will now be described with reference to the drawings.

Overall Configuration

Figure 1:
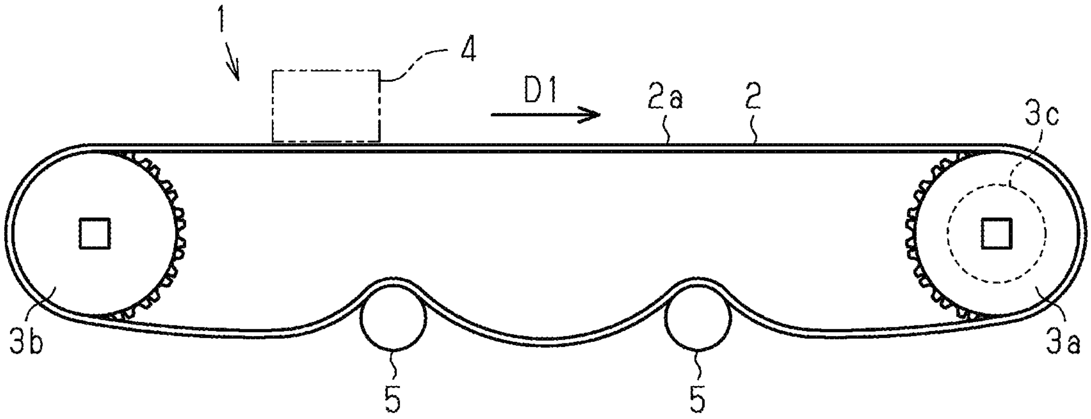
FIG. 1 is a side view of a belt conveying apparatus according to a first embodiment.

As shown in FIG. 1, a belt conveying apparatus 1 includes a conveyor belt 2, at least two sprockets 3*a*, 3*b*, and a drive source 3*c*. The conveyor belt 2 is an endless belt. The conveyor belt 2 is looped around sprockets 3*a* and 3*b*, which are spaced a predetermined distance apart in a first direction D1. The first direction D1 corresponds to an advancing direction of the conveyor belt 2. The upper surface of the conveyor belt 2 is a workpiece placement surface 2*a* on which the workpiece 4 is placed. The sprocket 3*a* is a driving-side sprocket whereas the sprocket 3*b* is a driven-side sprocket. The driving-side sprocket 3*a* is connected to the drive source 3*c* such as a motor, which is an example of a power source, through a power transmission mechanism. Thus, the driving-side sprocket 3*a* is driven by the drive source 3*c*. Additionally, rollers 5 are arranged on the lower side of the conveyor belt 2 to support the sagging of the conveyor belt 2.

First Embodiment

Conveyor Belt

Figure 2:
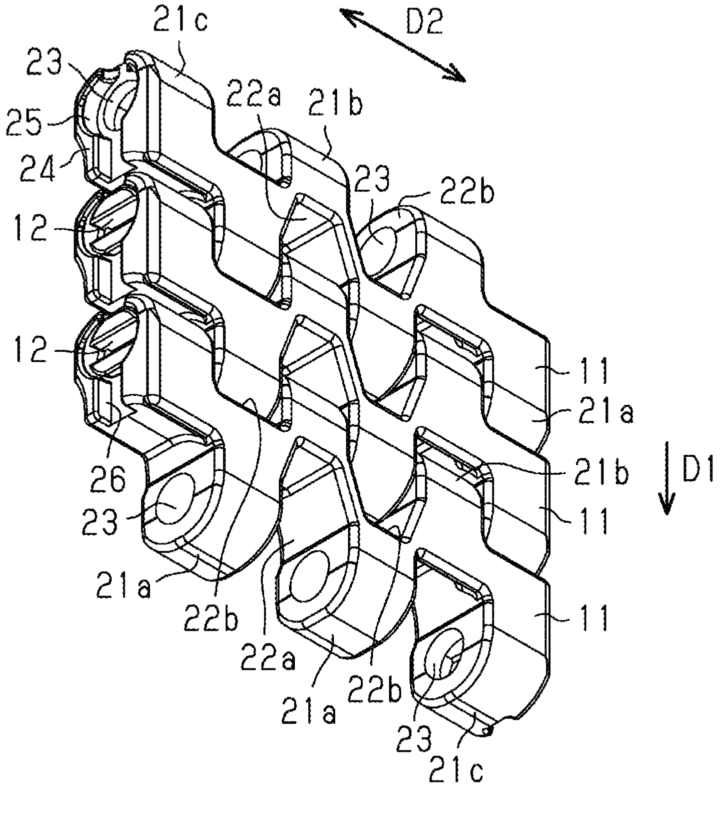
FIG. 2 is a perspective view of the conveyor belt used in the belt conveying apparatus shown in FIG. 1.

As shown in FIG. 2, the conveyor belt 2 is a modular chain (modular conveyor belt). The conveyor belt 2 includes belt components 11 and coupling shafts 12. The belt components 11 are aligned straight in a second direction D2, which corresponds to the width direction of the conveyor belt 2 intersecting the first direction D1, thereby defining a predetermined width. Further, the belt components 11 are aligned in the first direction D1 such that the length of the conveyor belt 2 in the first direction D1 has a predetermined length. The belt components 11 that are adjacent to each other in the first direction D1 are pivotably coupled. As a result, the belt components 11 aligned in the first direction D1 and the second direction D2 are coupled by the coupling shafts 12. The belt components 11 aligned in the first direction D1 are pivotable relative to each other.

The belt component 11 and the coupling shaft 12 are resin molded products made of plastic. For example, the belt component 11 and the coupling shaft 12 are molded products made of resin materials such as polyethylene, polyacetal, polypropylene, and engineering plastic.

Additionally, the coupling shaft 12 is an injection-molded component. The coupling shaft 12 has a cylindrical shape and includes a hollow portion. This enhances the dimensional stability of the coupling shaft 12. The coupling shaft 12 may be made of a solid material without a hollow portion. The coupling shaft 12 is molded in accordance with the dimension of the conveyor belt 2 in the second direction D2. The coupling shaft 12 includes a detachment prevention mechanism 32 at one end (see FIG. 3).

Belt Component

Figure 3:
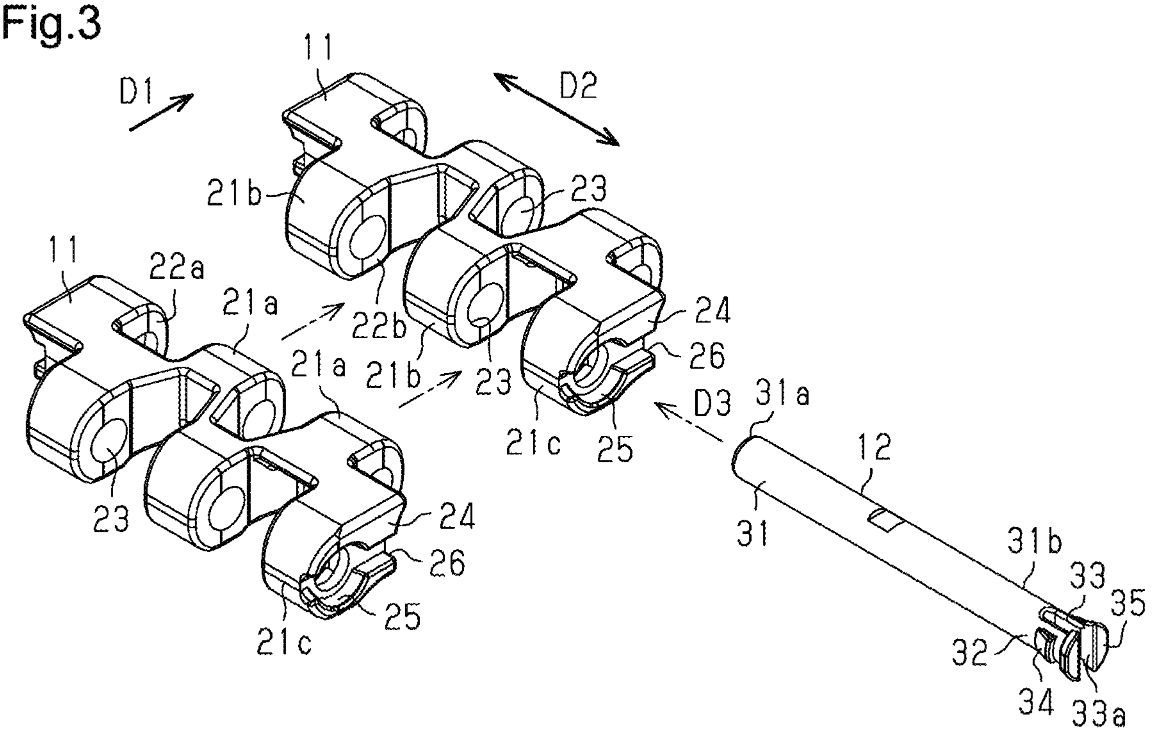
FIG. 3 is an exploded perspective view of the conveyor belt shown in FIG. 2.

As shown in FIGS. 2 and 3, the belt components 11 each include first coupling pieces 21*a* extending in the first direction D1 and second coupling pieces 21*b* extending in the direction opposite to the first direction D1. The first coupling pieces 21*a* are arranged parallel to each other in the second direction D2. The first coupling pieces 21*a* that are adjacent to each other form a U-shape. The second coupling pieces 21*b* are also arranged parallel to each other in the second direction D2. The second coupling pieces 21*b* that are adjacent to each other form a U-shape. One second coupling piece 21*b* is inserted into a first space 22*a* defined between two first coupling pieces 21*a* adjacent to each other. One first coupling piece 21*a* is inserted into a second space 22*b* defined between two second coupling pieces 21*b* adjacent to each other.

The first coupling piece 21*a* and the second coupling piece 21*b* each include a coupling hole 23. When the first coupling piece 21*a* is inserted into the second space 22*b*, the coupling hole 23 of the first coupling piece 21*a* overlaps the coupling hole 23 of the second coupling piece 21*b*. Similarly, when the second coupling piece 21*b* is inserted into the first space 22*a*, the coupling hole 23 of the first coupling piece 21*a* overlaps the coupling hole 23 of the second coupling piece 21*b*. This allows the coupling shaft 12 to be inserted into the coupling holes 23.

Figure 4:
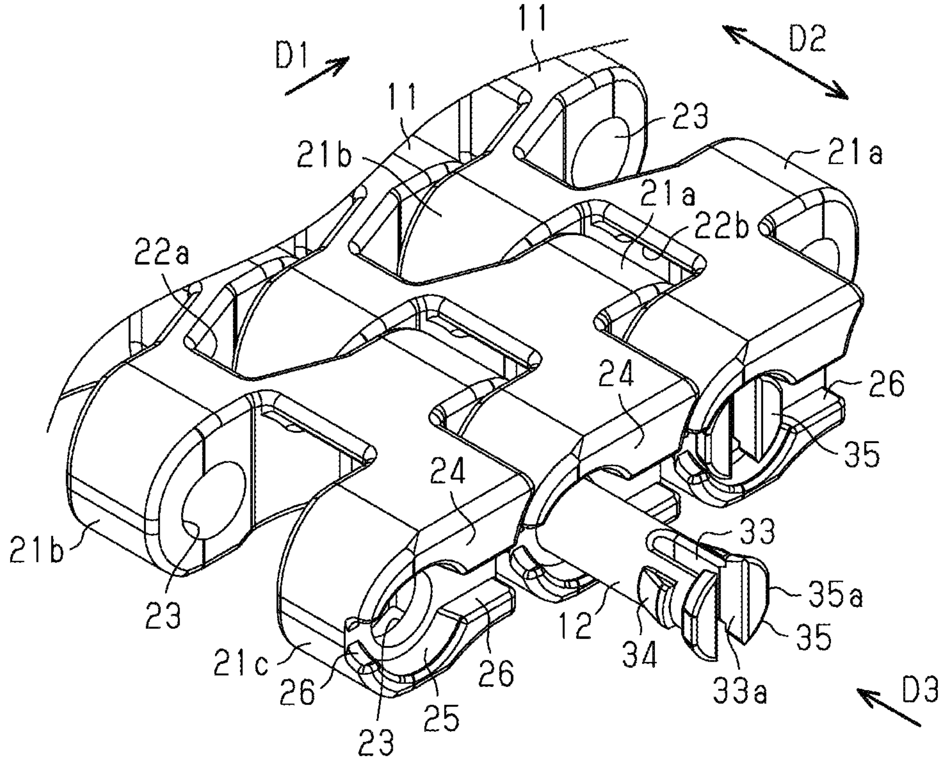
FIG. 4 is a diagram illustrating the state in which the coupling shaft is being inserted into the belt component of the conveyor belt shown in FIG. 3.
Figure 5:
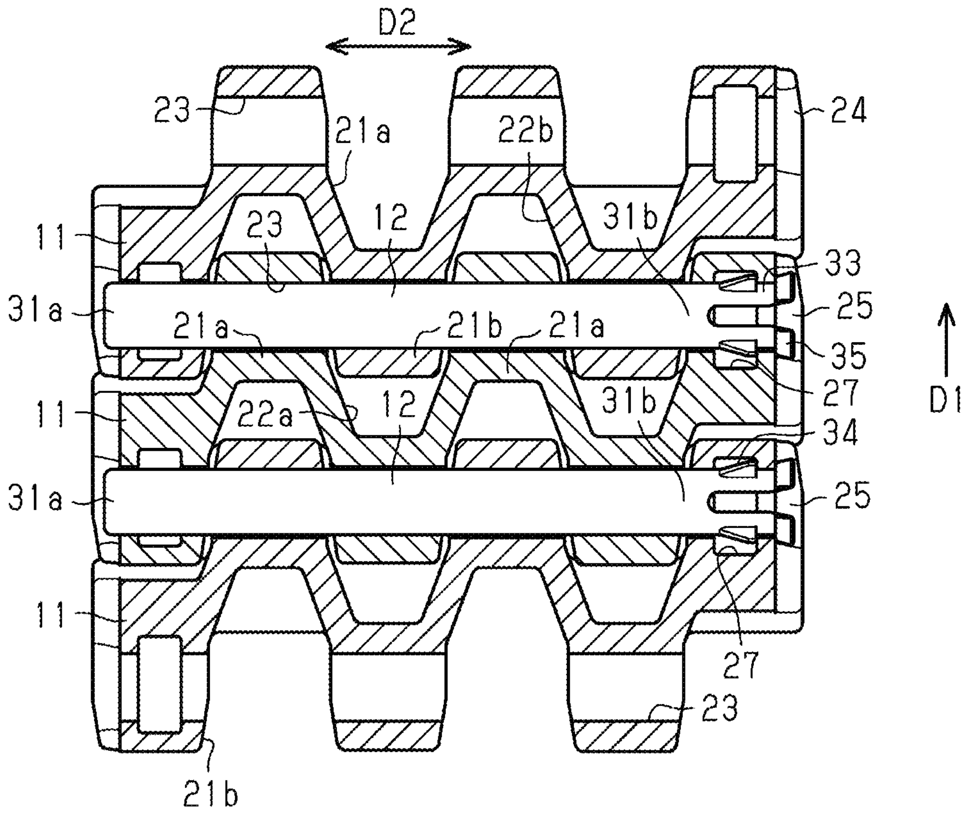
FIG. 5 is a cross-sectional view showing the state in which the coupling shaft is inserted into the belt component.

As shown in FIGS. 4 and 5, the coupling piece located at one end of the belt components 11 is an end coupling piece 21*c*. The end coupling piece 21*c* includes an insertion surface 24 located outside the end coupling piece 21*c*. The insertion surface 24 includes a circular recess 25 around the coupling hole 23. The recess 25 has a larger diameter than the coupling hole 23. The recess 25 accommodates a flange 35 located at the basal end of the coupling shaft 12. The side surface of the recess 25 expands in diameter from the bottom surface toward the opening end of the recess 25 to define an inclined surface 25*a*. Additionally, an operation groove 26 extends from the recess 25 outside the coupling hole 23 in the first direction D1 and in the direction opposite to the first direction D1. The operation groove 26 is a recessed groove designed for the insertion of the tip of a tool, such as a needle-nose plier or a standard plier, to grip the basal end of the coupling shaft 12 when extracting the coupling shaft 12. The operation groove 26 is configured such that, with the recess 25 in between, one side extends longer and the other side extends shorter in the first direction D1 and its opposite direction. The position of the operation groove 26 is aligned with a flat portion 35*b* (see FIG. 7) of the coupling shaft 12.

The coupling hole 23 of the end coupling piece 21*c* includes an engagement groove 27 on its inner circumferential surface. The engagement groove 27 is a recess on the inner circumferential surface of the coupling hole 23. The engagement groove 27 is an annular continuous groove that extends continuously in the circumferential direction of the coupling hole 23. The engagement groove 27 is configured to engage with engagement protrusions 34 located at the basal end of the coupling shaft 12. The side wall of the engagement groove 27 is a vertical surface. At least one of the two side walls of the engagement groove 27 that is relatively close to the insertion surface 24 is a vertical surface.

Coupling Shaft

Figure 6:
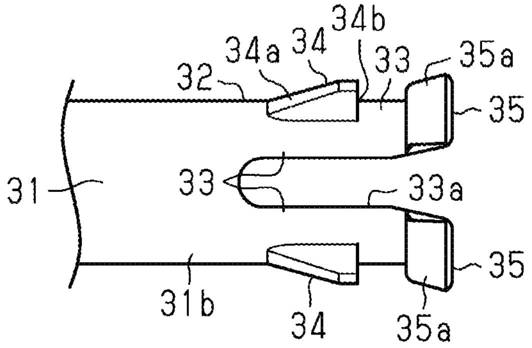
FIG. 6 is a front view of the main part of the coupling shaft.
Figure 7:
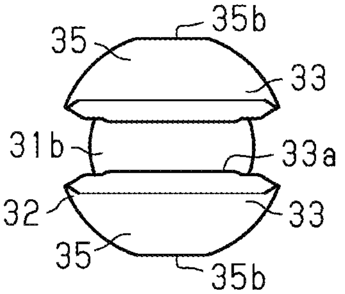
FIG. 7 is a side view of the main part of the coupling shaft.

As shown in FIGS. 6 and 7, the coupling shaft 12 includes a shaft portion 31, an insertion end 31*a* (see FIG. 5), and a basal end 31*b* opposite to the insertion end 31*a*. The basal end 31*b* includes a detachment prevention mechanism 32 to prevent detachment from the coupling hole 23.

The detachment prevention mechanism 32 includes elastic pieces 33. In the first embodiment, the elastic pieces 33 are two elastic pieces 33. The two elastic pieces 33 face each other with a U-shaped groove 33*a* in between. The two elastic pieces 33 move in the radial direction of the coupling shaft 12, specifically in a direction that brings them closer together or further apart, with a base portion of the elastic piece 33 serving as the point about which it moves. The two elastic pieces 33 each include the engagement protrusion 34 on its outer surface.

The engagement protrusion 34 has, for example, a right-angled triangular shape. The engagement protrusion 34 has an inclined surface that slopes from the insertion end 31*a* toward the basal end 31*b* of the shaft portion 31. The inclined surface of the engagement protrusion 34 is an insertion guide surface 34*a*. The insertion guide surface 34*a* guides the insertion of the coupling shaft 12 into the coupling hole 23. Further, the engagement protrusion 34 has a flat surface perpendicular to the shaft portion 31. The flat surface of the engagement protrusion 34 is an engagement surface 34*b*. The engagement surface 34*b* is configured to engage with the engagement groove 27 to prevent the coupling shaft 12 from falling out of the coupling hole 23.

The distal end of each elastic piece 33 includes the flange 35. Each flange 35 has a semicircular shape. The flange 35 includes an inclined surface 35*a* on its outer circumferential surface. The inclined surface 35*a* tapers from its distal end surface toward the rear surface relative to the distal end surface. Moreover, the top of each flange 35 includes the flat portion 35*b*. The flat portions 35*b*, respectively located on the flanges 35 of the two elastic pieces 33, face each other. Accordingly, pinching the two elastic pieces 33 with a tool makes it easier to move them closer together.

Operation of First Embodiment

Figure 8:
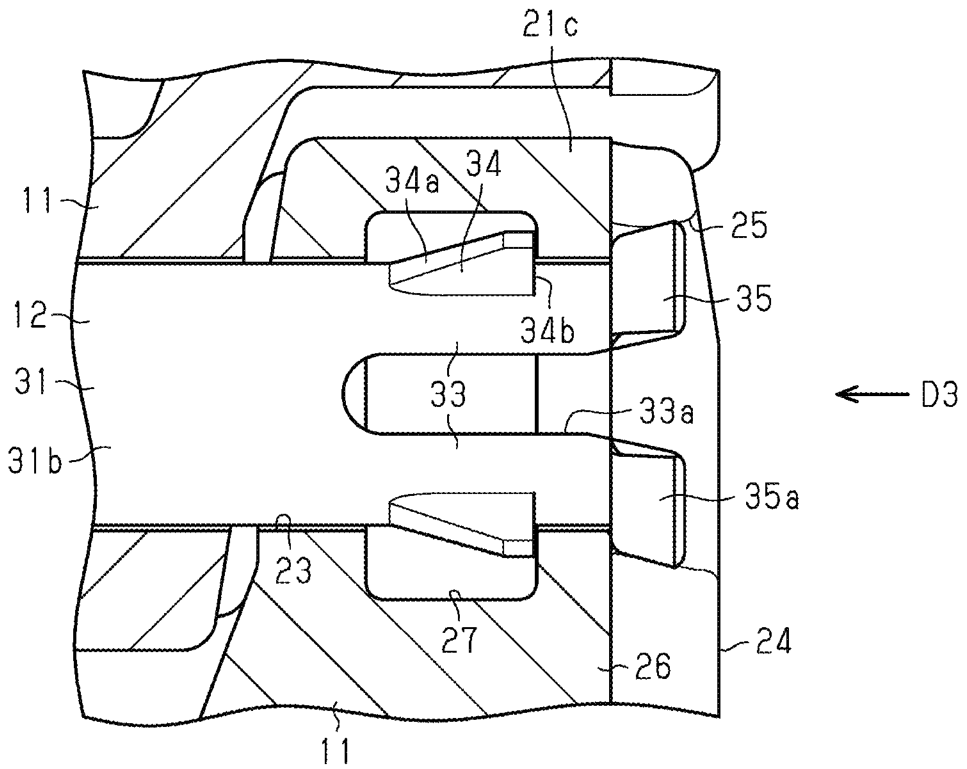
FIG. 8 is a cross-sectional view showing the state in which the engagement protrusion is engaged with the engagement groove of the coupling hole.

As shown in FIG. 8, in a state in which the belt components 11 are aligned in the first direction D1 and the second direction D2, the coupling shaft 12 is inserted into the coupling hole 23 of the end coupling piece 21*c*, which is located at the end in the second direction D2, from the insertion end 31*a* (in the direction indicated by arrow D3 in FIG. 3). When the coupling shaft 12 is inserted until it reaches the basal end 31*b*, the engagement protrusions 34 engage with the engagement groove 27 located on the inner circumferential surface of the coupling hole 23. To engage with the engagement groove 27, the engagement protrusions 34 are pressed while being respectively guided by the insertion guide surfaces 34*a* between the opening end of the coupling hole 23 and the engagement groove 27. Consequently, the two elastic pieces 33 temporarily flex toward each other. Then, the two elastic pieces 33 elastically return to their original positions. This causes the engagement surface 34*b* to engage with the side wall of the engagement groove 27, thereby preventing the coupling shaft 12 from moving in the direction opposite to that indicated by arrow D3. Additionally, the flanges 35 fit in the recess 25. The flanges 35 prevent the coupling shaft 12 from moving in the direction indicated by arrow D3.

The engagement protrusions 34 are configured not to engage in the engagement groove 27 in the circumferential direction. The flanges 35 are also configured not to engage in the recess 25 and are rotatable in the recess 25. Thus, the coupling shaft 12 is rotatable in the coupling hole 23 in a state in which the belt components 11 adjacent to each other are coupled.

When the conveyor belt 2 runs in the first direction D1, it receives a constant tension. This presses the coupling shaft 12 against the inner circumferential surface of each coupling hole 23. The coupling shaft 12 rotates in the coupling hole 23, for example, at a portion curved in an arcuate manner such as the sprocket 3*a*, 3*b*. If the coupling shaft 12 were engaged in the coupling hole 23 and were thus unable to rotate, a rotational force would be applied to the coupling shaft 12, resulting in a load due to twisting. If a load were repeatedly applied to the coupling shaft 12, the degradation of the coupling shaft 12 would accelerate. In the present embodiment, the coupling shaft 12 is rotatable in the coupling hole 23. This prevents the application of a load to the coupling shaft 12.

Figure 9:
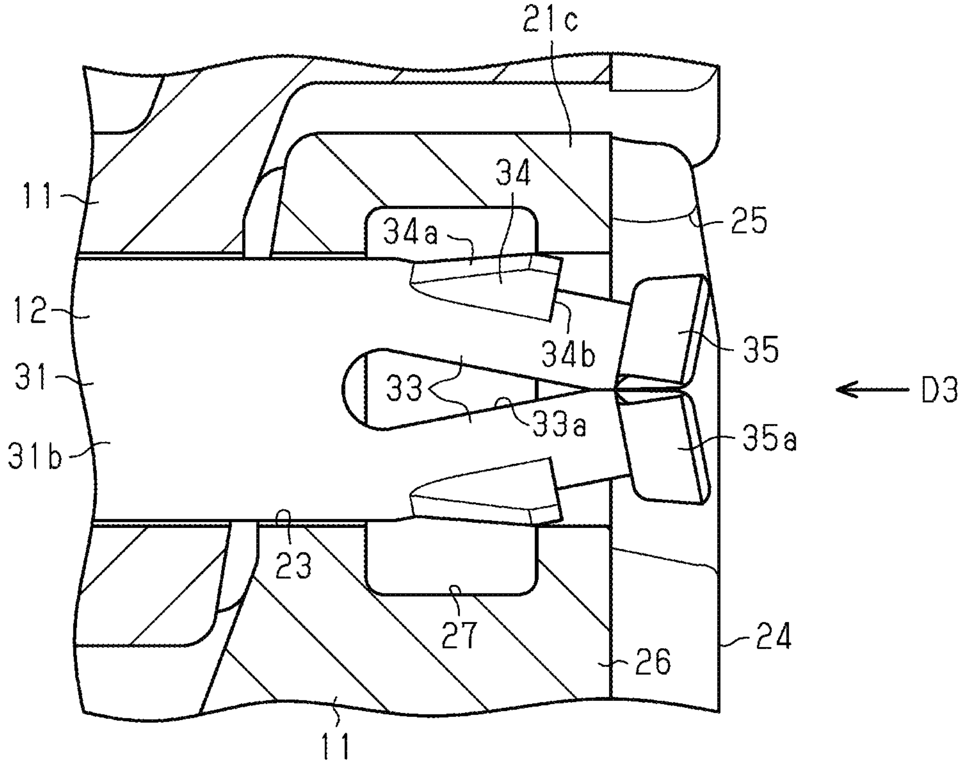
FIG. 9 is a cross-sectional view showing the state of the coupling shaft being extracted out of the coupling hole.
Figure 10:
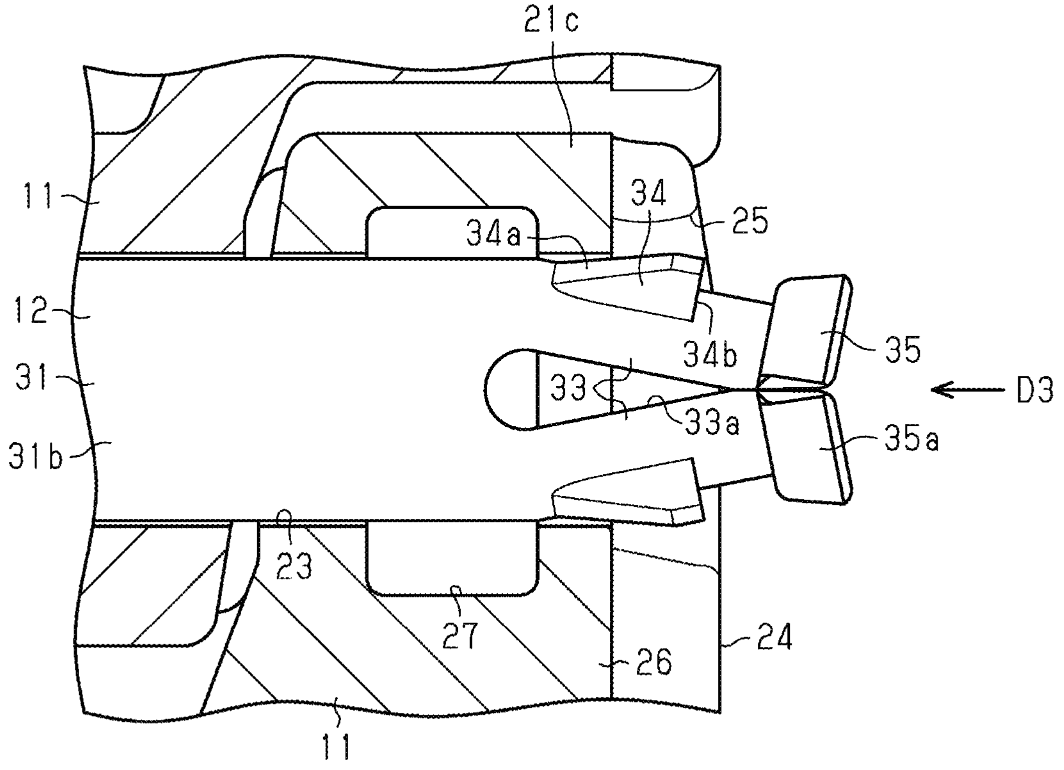
FIG. 10 is a cross-sectional view, continuing from FIG. 9, showing the state of the coupling shaft being extracted out of the coupling hole.

As illustrated in FIGS. 9 and 10, when the conveyor belt 2 is disassembled for maintenance or other purposes, the coupling shaft 12 is extracted out of the coupling hole 23. In this case, first, the coupling shaft 12 is rotated to align the position of the flat portion 35*b* of the flange 35 with the position of the operation groove 26. Then, the tip of the tool is engaged with the operation groove 26 to pinch the two elastic pieces 33 and bend them in a direction that brings them closer to each other. As a result, the engagement protrusion 34 is disengaged from the engagement groove 27. Then, without any further adjustment, the coupling shaft 12 is extracted in the direction opposite to the direction indicated by arrow D3.

Advantages of First Embodiment (1-1) The conveyor belt 2 does not require other components, such as plugs, to prevent the coupling shaft 12 from detaching from the coupling hole 23. This reduces the number of components in the conveyor belt 2, simplifying its structure.

(1-2) When the engagement protrusions 34 engage with the engagement groove 27, which is included in the inner circumferential surface of the coupling hole 23, it prevents the coupling shaft 12 from detaching from the coupling hole 23.

(1-3) To extract the coupling shaft 12 out of the coupling hole 23, the elastic piece 33 is bent. This enables the disengagement of the engagement protrusion 34 from the engagement groove 27. The coupling shaft 12 is then extracted out of the coupling hole 23. This allows the coupling shaft 12 to be smoothly extracted out of the coupling hole 23. Disassembly of the conveyor belt 2 is simplified by only pinching the elastic pieces 33 with a tool, making the disassembly process easier.

(1-4) During the insertion of the coupling shaft 12 into the coupling hole 23, the insertion guide surface 34*a*, which is an inclined surface, is pressed against the inner circumferential surface of the coupling hole 23. This allows the coupling shaft 12 to be inserted into the coupling hole 23 while flexing the elastic piece 33. When the coupling shaft 12 is inserted into the coupling hole 23, the engagement surface 34*b* securely engages with the side wall of the engagement groove 27. This prevents the coupling shaft 12 from detaching from the coupling hole 23.

(1-5) Two elastic pieces 33 move closer together or farther apart from each other. Such a simplified configuration allows the engagement protrusion 34 to engage with and disengage from the engagement groove 27.

(1-6) The coupling shaft 12 includes the flange 35, preventing the coupling shaft 12 from being excessively inserted into the coupling hole 23. The flange 35, when positioned in the recess 25, prevents protrusion from the insertion surface 24. The flange 35 is configured not to engage with the recess 25 and is rotatable in the recess 25. Thus, the coupling shaft 12 is prevented from receive a load such as twisting.

(1-7) The flange 35 smoothly fits into the recess 25 as the inclined surface 35*a* on its outer circumferential surface is guided by the inclined surface 25*a* of the recess 25.

(1-8) The belt component 11 includes the operation groove 26, which allows the tip of a tool to be positioned in the operation groove 26, making it easier to pinch and extract the elastic pieces 33.

(1-9) If the engagement protrusion 34 were located at the insertion end of the coupling shaft 12, pushing the coupling shaft 12 too far in the insertion direction could cause the insertion guide surface 34*a* to be pressed against the side wall of the engagement groove 27, resulting in the elastic pieces 33 flexing toward each other. Then, the engagement protrusion 34 would end up entering further into the coupling hole 23. As a result, the tip of the coupling shaft 12 might protrude from the surface opposite to the insertion surface 24. In some cases, there is a risk that it could become fully detached.

Additionally, it would be possible to provide an arcuate engagement protrusion on the inner circumferential surface of the coupling hole 23 and an engagement groove on the outer circumferential surface of the coupling shaft 12 configured to engage with the engagement protrusion. In such a configuration, if the coupling shaft 12 were pushed too far in the insertion direction, the engagement protrusion might disengage from the engagement groove, causing the tip to protrude from the surface opposite to the insertion surface 24, with the risk that it might become fully detached in the same manner as above.

In the present embodiment, the engagement protrusion 34 is located at the basal end. Further, the flange 35 is located at the basal end. Thus, when the engagement protrusion 34 engages with the engagement groove 27, the flange 35 prevents situations in which the coupling shaft 12 advances excessively in the insertion direction. Further, the engagement of the engagement surface 34*b* with the side wall of the engagement groove 27 limits detachment of the coupling shaft 12 in the direction opposite to the insertion direction.

Second Embodiment

The coupling shaft 12 in the first embodiment must be made longer as the width of the conveyor belt 2 in the second direction D2 increases. When integrally provided with the detachment prevention mechanism 32, the coupling shaft 12 is manufactured through injection-molding. Thus, if the conveyor belt 2 in the first embodiment is larger and wider, it becomes challenging to manufacture a corresponding coupling shaft 12 through injection-molding.

Figure 11:
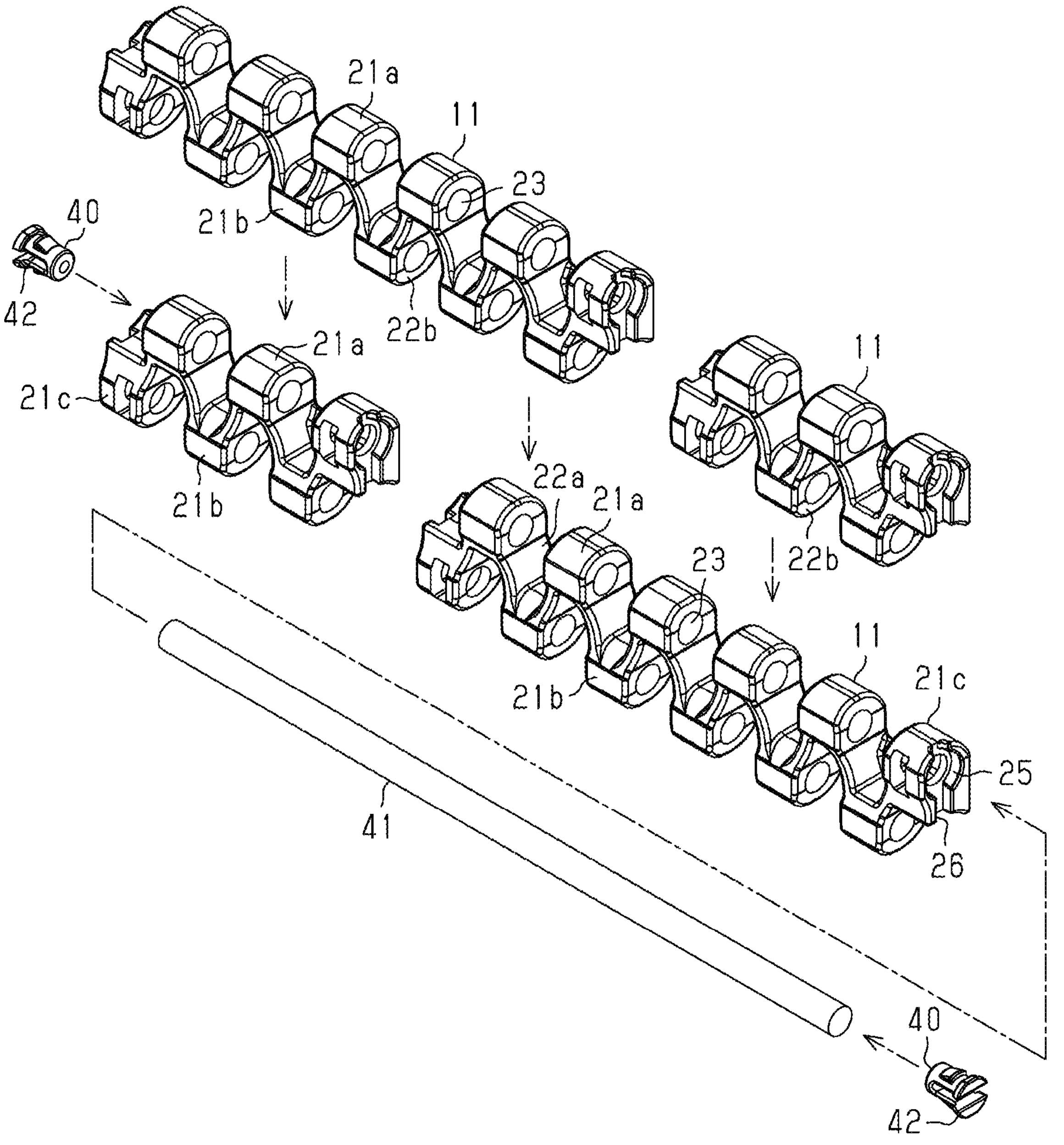
FIG. 11 is an exploded perspective view of the conveyor belt according to a second embodiment.

Thus, as shown in FIG. 11, a coupling shaft 41 used in the second embodiment includes a smooth curved surface without any grooves or protrusions extending in the circumferential direction. Thus, the coupling shaft 41 is a shaft member that has the same cross-sectional shape, regardless of where it is cut. The coupling shaft 41 has a cylindrical shape and includes a hollow portion. This enhances the dimensional stability of the coupling shaft 41. This coupling shaft 41 has a simpler structure compared to the coupling shaft 12 of the first embodiment, and is an extruded molded product. The coupling shaft 41 is used by cutting it to a length shorter by the depth of the coupling hole 23 of the end coupling piece 21*c* or by the thickness of the end coupling piece 21*c*, relative to the dimension, in the second direction D2, of the conveyor belt 2 being used. The coupling shaft 41 may also be shorter if necessary. The coupling shaft 41 may be a solid material without a hollow portion. The detachment prevention members 42 are located at opposite ends of the coupling shaft 41 to close the coupling holes 23 of the end coupling pieces 21*c*.

Figure 12:
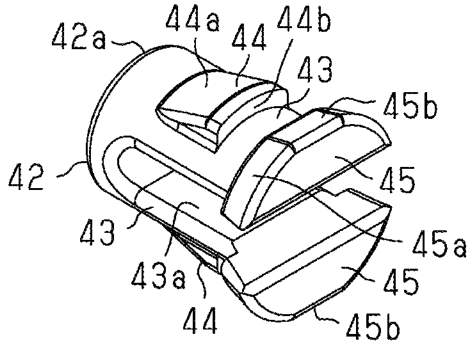
FIG. 12 is a perspective view of the detachment prevention member.

As shown in FIG. 12, the detachment prevention member 42 includes a body 42*a*. The body 42*a* includes multiple elastic pieces 43. In the second embodiment, the elastic pieces 43 are two elastic pieces 43. The two elastic pieces 43 face each other with a U-groove 43*a* located in between. The two elastic pieces 43 elastically move in the radial direction of the coupling shaft 41, specifically in a direction that brings them closer together or further apart, with a base portion of the elastic piece 43 serving as the point about which it moves. The two elastic pieces 43 each include an engagement protrusion 44 on its outer surface. In the body 42*a*, the base sides of the two elastic pieces 43 serve as the insertion end 40 from which the coupling shaft 41 is inserted into the coupling hole 23.

The engagement protrusion 44 has, for example, a right-angled triangular shape. The engagement protrusion 44 has an inclined surface that slopes from the insertion end 40 toward the distal end of the elastic piece 43. The inclined surface of the engagement protrusion 44 is an insertion guide surface 44*a*. The insertion guide surface 44*a* guides the insertion of the detachment prevention member 42 into the coupling hole 23. Further, the engagement protrusion 44 has a surface perpendicular to the body 42*a*. That surface of the engagement protrusion 44 is an engagement surface 44*b*.

The engagement surface 44*b* is configured to engage with the engagement groove 27 to prevent the coupling shaft 41 and the detachment prevention member 42 from falling out of the coupling hole 23.

The distal end of each elastic piece 43 includes a flange 45. Each flange 45 has a semicircular shape. The flange 45 includes an inclined surface 45*a* on its outer circumferential surface. The inclined surface 45*a* tapers from the distal end surface toward the rear surface relative to the distal end surface. Moreover, the top of the flange 45 includes a flat portion 45*b*. The flat portions 45*b*, respectively located on the flanges 45 of the two elastic pieces 43, face each other. Accordingly, pinching the two elastic pieces 43 with a tool makes it easier to move them closer together.

Operation of Second Embodiment

Figure 13:
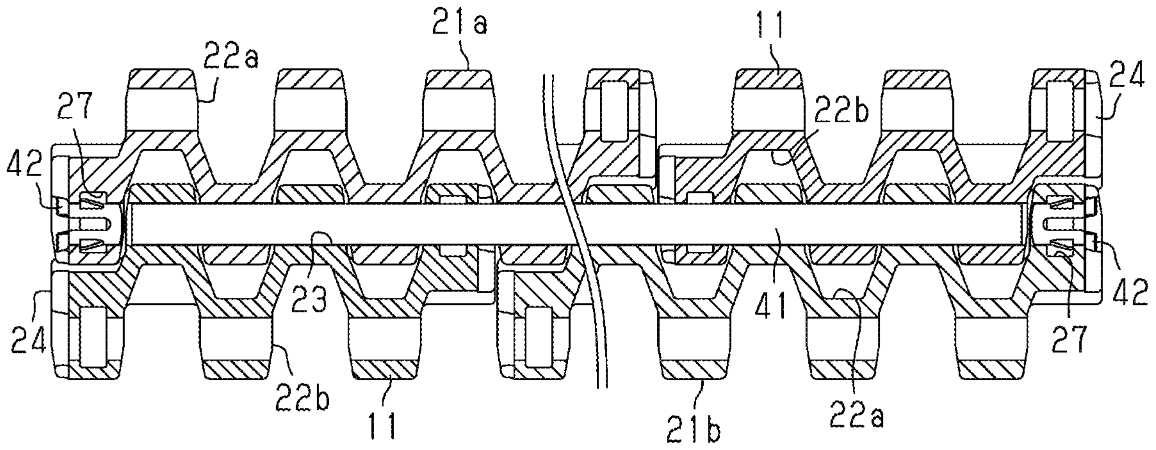
FIG. 13 is a cross-sectional view showing the state in which the coupling shaft is inserted into the belt component.
Figure 14:
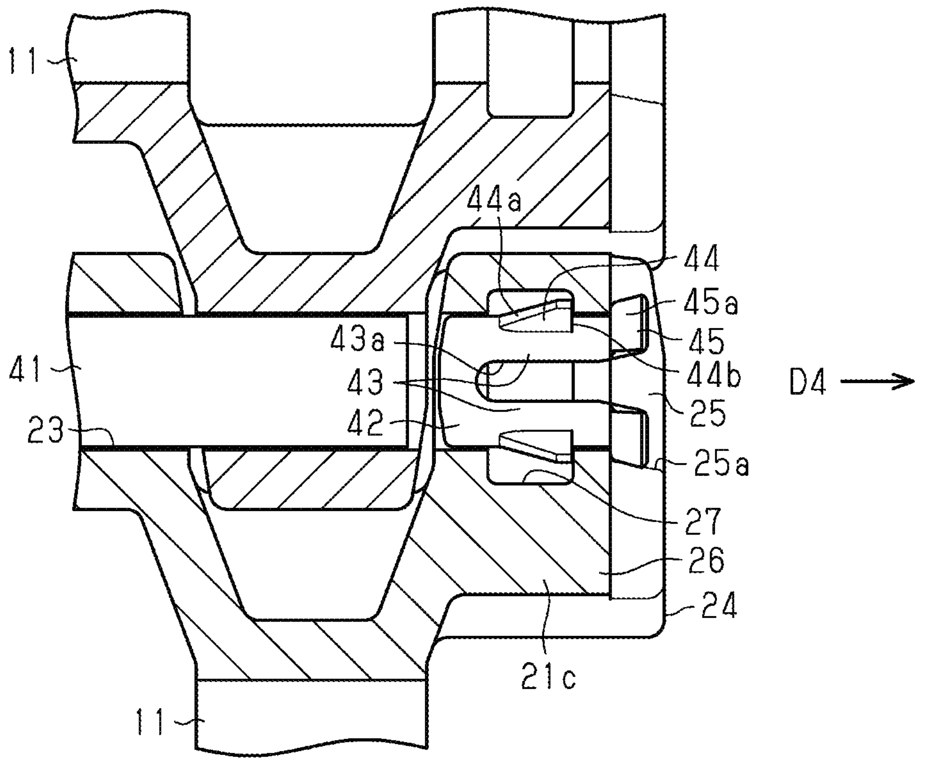
FIG. 14 is a cross-sectional view showing the state in which the engagement protrusion is engaged with the engagement groove of the coupling hole.

As shown in FIGS. 13 and 14, in a state in which the belt components 11 are aligned in the first direction D1 and the second direction D2, the coupling shaft 41 is inserted from the insertion end 31*a* into the coupling hole 23 of the end coupling piece 21*c*, which is located at the end in the second direction D2. Subsequently, the detachment prevention members 42 are respectively inserted into the coupling holes 23 of the end coupling pieces 21*c* located at the opposite ends in the second direction D2. The detachment prevention members 42 are attached in correspondence with the opposite ends of the coupling shaft 41. In other words, the detachment prevention members 42 are arranged on the opposite sides of the conveyor belt 2 in the second direction D2.

As a result, the engagement protrusions 44 engage with the engagement groove 27 in the inner circumferential surface of the coupling hole 23. To engage with the engagement groove 27, the engagement protrusions 44 are pressed while respectively being guided by the insertion guide surfaces 44*a* between the opening end of the coupling hole 23 and the engagement groove 27. Consequently, the two elastic pieces 43 temporarily flex toward each other. Then, the two elastic pieces 43 elastically return to their original positions. This causes the engagement surfaces 44*b* to engage with the side wall of the engagement groove 27, thereby preventing the coupling shaft 41 from moving in the direction indicated by arrow D4 (see FIG. 14). The flanges 45 prevent the coupling shaft 41 from moving in the direction opposite to that indicated by arrow D4.

Additionally, the flanges 45 fit in the recess 25. The engagement protrusions 44 are configured not to engage in the engagement groove 27 in the circumferential direction. Further, the flanges 45 are rotatable in the recess 25. Thus, the detachment prevention member 42 is rotatable in the coupling hole 23 in a state in which the belt components 11 adjacent to each other are coupled.

The coupling shaft 41, which is separate from the detachment prevention members 42, is rotatable in the coupling hole 23. When the conveyor belt 2 runs in the first direction D1, it receives a constant tension. This presses the coupling shaft 41 and the detachment prevention members 42 against the inner circumferential surface of each coupling hole 23. Such a configuration limits the application of a load to the coupling shaft 41 and the detachment prevention members 42.

When the conveyor belt 2 is disassembled for maintenance or other purposes, the coupling shaft 41 and the detachment prevention member 42 are separated from the coupling hole 23. First, one of the detachment prevention members 42, respectively located at the opposite ends of the coupling shaft 41, are separated from the coupling hole 23. Specifically, the detachment prevention member 42 to be detached is rotated such that the positions of the flat portions 45*b* of the flanges 45 align with the position of the operation groove 26. Then, the tip of the tool is engaged with the operation groove 26 to pinch the elastic pieces 43 and bend them in a direction that brings them closer to each other. As a result, the engagement protrusions 44 are disengaged from the engagement groove 27. Then, one of the two detachment prevention members 42 in this state is extracted in the direction indicated by arrow D4. When at least one of the detachment prevention members 42 is detached, the coupling shaft 41 can be extracted. The other detachment prevention member 42 may be detached from the coupling hole 23 either before or after extracting the coupling shaft 41. Moreover, the conveyor belt 2 can be disassembled even in a state in which the other detachment prevention member 42 is left in place.

Advantage of Second Embodiment (2-1) In a wider conveyor belt 2, the coupling shaft 41 does not have grooves or protrusions extending in the circumferential direction. Thus, since the shaft member has the same cross-sectional shape, it can be cut at any position when being used. Using the detachment prevention members 42 for the coupling shaft 41 prevents the coupling shaft 41 from detaching from the coupling hole 23.

Modifications

The conveyor belt 2 may be, for example, in the form of each modification described below or in a form obtained by combining two of the modifications that do not contradict each other.

In the first and second embodiments, the operation groove 26 in the insertion surface 24 of the end coupling piece 21*c* may be omitted. In a case in which the operation groove 26 is omitted, for example, if the recess 25 is made larger than the flange 35, 45, then the tip of a tool can be inserted into the gap between the side wall of the recess 25 and the outer circumferential surface of the flange 35, 45, allowing the elastic piece 33, 43 to be gripped.

In the first and second embodiments, the flanges 35, 45 of the elastic pieces 33, 43 do not have to be provided on all the elastic pieces 33, 43, and only have to be provided solely on at least one elastic piece 33, 43. This configuration prevents the coupling shaft 12 from being excessively inserted into the coupling hole 23 in the first embodiment and prevents the detachment prevention member 42 from being excessively inserted into the coupling hole 23 in the second embodiment.

In the second embodiment, the flanges 45 of each detachment prevention member 42 may be shaped to be engageable with the recess 25. The detachment prevention member 42 is a component independent from the coupling shaft 41.

There may be one elastic piece 33, 43. Instead, there may be three or more elastic pieces 33, 43. When there is one elastic piece 33, 43, the flange 35, 45 may or may not be provided. When there are three or more elastic pieces 33, 43, the flanges 35, 45 may or may not be provided on all the elastic pieces 33, 43. That is, the flange 35, 45 only needs to be provided on at least one of the elastic pieces 33, 43.

The engagement protrusion 34, 44 does not have to include the insertion guide surface 34*a*, 44*a*. Even if there is no insertion guide surface 34*a*, 44*a*, the engagement protrusion 34, 44 is engageable with the engagement groove 27 by moving the elastic pieces 33, 43 toward each other during insertion.

The engagement surface 34*b*, 44*b* is not limited to a flat surface perpendicular to the axis of the coupling shaft 12, 41. Instead, the engagement surface 34*b*, 44*b* may be, for example, a projecting or recessed arcuate surface or may be an inclined surface sloped in a certain direction.

Each elastic piece 33, 43 may include one engagement protrusion 34, 44 or may include two or more engagement protrusions 34, 44.

The belt components 11 do not have to be made of resin and may be made of metal.

The coupling shaft 12, 41 does not have to be made of resin and may be made of metal.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A conveyor belt, comprising:

belt components adjacent to each other in a first direction, the first direction being an advancing direction in which a workpiece is conveyed; and a coupling shaft extending in a second direction, the coupling shaft pivotably coupling the belt components adjacent to each other in the first direction, and the second direction intersecting the first direction and corresponding to a width direction of the conveyor belt, wherein each of the belt components includes coupling pieces that are arranged parallel to each other in the second direction, the coupling pieces each including a coupling hole through which the coupling shaft is inserted, the belt components adjacent to each other in the first direction are coupled by inserting, into a space between the coupling pieces of one of the belt components, the coupling piece of the other one of the belt components so that the coupling shaft is inserted through the coupling holes that are overlapped, the coupling shaft includes elastic pieces that move in a radial direction of the coupling hole, the elastic pieces being located at a basal end opposite to an insertion end from which the coupling shaft is inserted into the coupling hole, and at least one of the elastic pieces including an engagement protrusion on an outer surface of the elastic piece, the coupling piece located at an end of the coupling pieces in the second direction is an end coupling piece, the end coupling piece including an engagement groove on an inner circumferential surface of the coupling hole, the engagement groove extending continuously in a circumferential direction of the coupling hole, and the engagement protrusion being configured to engage with the engagement groove, and the end coupling piece includes an insertion surface from which the coupling shaft is inserted, the insertion surface including an operation groove extending from an opening end of the coupling hole.

2. The conveyor belt according to claim 1, wherein the engagement protrusion includes:

an inclined surface located on a surface of the engagement protrusion in a direction in which the coupling shaft is inserted into the coupling hole, the inclined surface being configured to guide insertion into the coupling hole; and an engagement surface located on a surface of the engagement protrusion in a direction opposite to the direction of the insertion, the engagement surface being configured to engage with the engagement groove.

3. The conveyor belt according to claim 1, wherein the elastic pieces are two elastic pieces, and the elastic pieces each include the engagement protrusion on the outer surface of the elastic piece.

4. The conveyor belt according to claim 1, wherein a tip of each of the elastic pieces includes a flange, the end coupling piece includes an insertion surface from which the coupling shaft is inserted, the insertion surface including a recess that accommodates the flange, and the recess is shaped so as not to engage with the flange, allowing the coupling shaft to rotate around an axis.

5. A belt conveying apparatus, comprising a conveyor belt, the belt conveying apparatus being configured to convey a workpiece by running the conveyor belt, wherein the conveyor belt is the conveyor belt according to claim 1.

6. A conveyor belt, comprising:

belt components adjacent to each other in a first direction, the first direction being an advancing direction in which a workpiece is conveyed; and a coupling shaft extending in a second direction, the coupling shaft pivotably coupling the belt components adjacent to each other in the first direction, and the second direction intersecting the first direction and corresponding to a width direction of the conveyor belt, wherein each of the belt components includes coupling pieces that are arranged parallel to each other in the second direction, the coupling pieces each including a coupling hole through which the coupling shaft is inserted, the belt components adjacent to each other in the first direction are coupled by inserting, into a space between the coupling pieces of one of the belt components, the coupling piece of the other one of the belt components so that the coupling shaft is inserted through the coupling holes that are overlapped, the coupling piece located at an end of the coupling pieces in the second direction is an end coupling piece, a detachment prevention member that prevents the coupling shaft from being removed is arranged in the coupling hole of the end coupling piece, the detachment prevention member includes elastic pieces that move in a radial direction of the coupling hole, at least one of the elastic pieces including an engagement protrusion on an outer surface of the elastic piece, the end coupling piece includes an engagement groove on an inner circumferential surface of the coupling hole, the engagement groove extending continuously in a circumferential direction of the coupling hole, and the engagement protrusion being configured to engage with the engagement groove, and the end coupling piece includes an insertion surface from which the coupling shaft is inserted, the insertion surface including an operation groove extending from an opening end of the coupling hole.

7. The conveyor belt according to claim 6, wherein the engagement protrusion includes:

an inclined surface located on a surface of the engagement protrusion in a direction in which the detachment prevention member is inserted into the coupling hole, the inclined surface being configured to guide insertion into the coupling hole; and an engagement surface located on a surface of the engagement protrusion in a direction opposite to the direction of the insertion, the engagement surface being configured to engage with the engagement groove.

8. The conveyor belt according to claim 6, wherein the elastic pieces are two elastic pieces, and the elastic pieces each include the engagement protrusion on the outer surface of the elastic piece.

9. The conveyor belt according to claim 6, wherein a tip of each of the elastic pieces includes a flange, the end coupling piece includes an insertion surface from which the coupling shaft is inserted, the insertion surface including a recess that accommodates the flange, and the recess is shaped so as not to engage with the flange, allowing the detachment prevention member to rotate around an axis.

10. The conveyor belt according to claim 6, wherein the coupling shaft has a circumferential surface that is smooth and curved.

11. A belt conveying apparatus, comprising a conveyor belt, the belt conveying apparatus being configured to convey a workpiece by running the conveyor belt, wherein the conveyor belt is the conveyor belt according to claim 6.

12. A conveyor belt, comprising:

belt components adjacent to each other in a first direction, the first direction being an advancing direction in which a workpiece is conveyed; and a coupling shaft extending in a second direction, the coupling shaft pivotably coupling the belt components adjacent to each other in the first direction, and the second direction intersecting the first direction and corresponding to a width direction of the conveyor belt, wherein each of the belt components includes coupling pieces that are arranged parallel to each other in the second direction, the coupling pieces each including a coupling hole through which the coupling shaft is inserted, the belt components adjacent to each other in the first direction are coupled by inserting, into a space between the coupling pieces of one of the belt components, the coupling piece of the other one of the belt components so that the coupling shaft is inserted through the coupling holes that are overlapped, the coupling shaft includes elastic pieces that move in a radial direction of the coupling hole, the elastic pieces being located at a basal end opposite to an insertion end from which the coupling shaft is inserted into the coupling hole, and at least one of the elastic pieces including an engagement protrusion on an outer surface of the elastic piece, the coupling piece located at an end of the coupling pieces in the second direction is an end coupling piece, the end coupling piece including an engagement groove on an inner circumferential surface of the coupling hole, the engagement groove extending continuously in a circumferential direction of the coupling hole, and the engagement protrusion being configured to engage with the engagement groove, a tip of each of the elastic pieces includes a flange, the end coupling piece includes an insertion surface from which the coupling shaft is inserted, the insertion surface including a recess that accommodates the flange, and the flanges of the elastic pieces are separated from each other.

13. The conveyor belt according to claim 12, wherein the basal end of the coupling shaft includes a groove, and the groove opens at a basal end surface of the coupling shaft such that the flanges of the elastic pieces are separated from each other.

14. The conveyor belt according to claim 12, wherein the elastic pieces are two elastic pieces, and the flange of each of the two elastic pieces has a semicircular shape having a flattened apex portion.

15. A belt conveying apparatus, comprising a conveyor belt, the belt conveying apparatus being configured to convey a workpiece by running the conveyor belt, wherein the conveyor belt is the conveyor belt according to claim 12.

16. A conveyor belt, comprising:

belt components adjacent to each other in a first direction, the first direction being an advancing direction in which a workpiece is conveyed; and a coupling shaft extending in a second direction, the coupling shaft pivotably coupling the belt components adjacent to each other in the first direction, and the second direction intersecting the first direction and corresponding to a width direction of the conveyor belt, wherein each of the belt components includes coupling pieces that are arranged parallel to each other in the second direction, the coupling pieces each including a coupling hole through which the coupling shaft is inserted, the belt components adjacent to each other in the first direction are coupled by inserting, into a space between the coupling pieces of one of the belt components, the coupling piece of the other one of the belt components so that the coupling shaft is inserted through the coupling holes that are overlapped, the coupling piece located at an end of the coupling pieces in the second direction is an end coupling piece, a detachment prevention member that prevents the coupling shaft from being removed is arranged in the coupling hole of the end coupling piece, the detachment prevention member includes elastic pieces that move in a radial direction of the coupling hole, at least one of the elastic pieces including an engagement protrusion on an outer surface of the elastic piece, the end coupling piece includes an engagement groove on an inner circumferential surface of the coupling hole, the engagement groove extending continuously in a circumferential direction of the coupling hole, and the engagement protrusion being configured to engage with the engagement groove, a tip of each of the elastic pieces includes a flange, the end coupling piece includes an insertion surface from which the coupling shaft is inserted, the insertion surface including a recess that accommodates the flange, and the flanges of the elastic pieces are separated from each other.

17. The conveyor belt according to claim 16, wherein the detachment prevention member includes a groove and an end surface on a side opposite to an insertion side from which the detachment prevention member is inserted into the coupling hole of the end coupling piece, and the groove opens at the end surface such that the flanges of the elastic pieces are separated from each other.

18. The conveyor belt according to claim 16, wherein the elastic pieces are two elastic pieces, and the flange of each of the two elastic pieces has a semi-circular shape having a flattened apex portion.

19. A belt conveying apparatus, comprising a conveyor belt, the belt conveying apparatus being configured to convey a workpiece by running the conveyor belt, wherein the conveyor belt is the conveyor belt according to claim 16.

* * * * *